(12) United States Patent
Yu

(10) Patent No.: US 12,506,491 B2
(45) Date of Patent: Dec. 23, 2025

(54) SAMPLING CIRCUIT, METHOD FOR USING SAMPLING CIRCUIT, STORAGE MEDIUM, AND ELECTRONIC DEVICE

(71) Applicant: SANECHIPS TECHNOLOGY CO., LTD, Shenzhen (CN)

(72) Inventor: Hejie Yu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 125 days.

(21) Appl. No.: 18/710,843

(22) PCT Filed: Mar. 19, 2022

(86) PCT No.: PCT/CN2022/081859
§ 371 (c)(1),
(2) Date: May 16, 2024

(87) PCT Pub. No.: WO2023/087588
PCT Pub. Date: May 25, 2023

(65) Prior Publication Data
US 2025/0015812 A1   Jan. 9, 2025

(30) Foreign Application Priority Data
Nov. 16, 2021  (CN) .......................... 202111355645.3

(51) Int. Cl.
*H03M 1/00* (2006.01)
*G11C 7/16* (2006.01)
(Continued)

(52) U.S. Cl.
CPC ............. *H03M 1/1255* (2013.01); *G11C 7/16* (2013.01); *H03L 7/085* (2013.01)

(58) Field of Classification Search
CPC ...... H04L 25/14; H04L 1/243; H04L 25/0272; H04L 7/033; H04L 7/0334; H04L 1/0003;
(Continued)

(56) References Cited

U.S. PATENT DOCUMENTS 4,868,513 A * 9/1989 Piercy .................... H03L 7/081
331/25
6,657,953 B1   12/2003 Hiramoto et al.
(Continued)

FOREIGN PATENT DOCUMENTS

| CN | 110383258 A | 10/2019 |
|---|---|---|
| CN | 111490867 A | 8/2020 |

(Continued)

OTHER PUBLICATIONS

European Search Report for corresponding application EP22894134; Report dated Feb. 3, 2025.
(Continued)

*Primary Examiner* — Linh V Nguyen
(74) *Attorney, Agent, or Firm* — CANTOR COLBURN LLP

(57) ABSTRACT

Provided are a sampling circuit and a sampling method. The circuit comprises: a generator, configured to generate a first loopback pulse signal; a loopback selection module, configured to establish a plurality of loopback links according to a pre-configured connection combination; a link loopback pulse signal transmission module, configured to receive the first loopback pulse signal, and transmit the first loopback pulse signal in the plurality of loopback links; a loopback sampling module, connected to the link loopback pulse signal transmission module and configured to determine, from the plurality of loopback links, a target loopback link on which sampling is to be performed, and sample first link data that is on the target loopback link and passes through a
(Continued)

target sampling point, and a sampling storage module, connected to the loopback sampling module and configured to store sampling data in a random access memory.

20 Claims, 7 Drawing Sheets

(51) Int. Cl.
*H03L 7/085* (2006.01)
*H03M 1/12* (2006.01)

(58) Field of Classification Search
CPC ... H04L 1/0009; H04L 1/0026; H04L 1/0041; H04L 1/0047; H04L 1/0054; H04L 1/006; H04L 1/0061; H04L 1/007; H04L 1/08; H04L 1/203; H04L 1/241; H04L 1/242; H04L 2025/03363; H04L 2025/03369; H04L 2025/03414; H04L 2025/03477; H04L 2025/0349; H04L 2025/03496; H04L 2025/03503; H04L 2025/03617; H04L 2025/03745; H04L 2025/0377; H04L 2025/03802; H04L 25/0204; H04L 25/0224; H04L 25/03038; H04L 25/03057; H04L 25/03146; H04L 25/03267; H04L 25/03343; H04L 25/03885; H04L 25/067; H04L 25/49; H04L 25/4917; H04L 25/497; H04L 43/028; H04L 43/50; H04L 49/35; H04L 67/565; H04L 69/00; H04L 69/22; H04L 69/323; H04L 69/324; H04L 7/0008; H04L 7/0025; H04L 7/005; H04L 7/0062; H04L 7/0083; H04L 7/0331; H04L 7/04; H04L 7/046; H04B 1/40; H04B 1/036; H04B 1/1615; H04B 10/299; H04B 17/14; H04B 17/318; H04B 3/23; H04B 3/32; H04B 7/0491; H04B 7/0617; H04B 7/0626; H04B 7/0682; H04B 7/0684; H04B 7/0695; H04B 7/088; H04J 3/0685; H04J 2203/0026; H04J 2203/005; H04J 3/04; G04F 10/00; G04F 10/005; H03M 1/00; H03M 1/0614; H03M 1/1033; H03M 1/1095; H03M 1/12; H03M 1/1215; H03M 1/1225; H03M 1/1245; H03M 1/1255; H03M 1/188; H03M 1/68; H03M 1/70; H03M 13/09; H03M 5/04; H03M 7/30
USPC ......... 341/118–120, 140, 141, 143, 144, 155
See application file for complete search history.

(56) References Cited

U.S. PATENT DOCUMENTS

| | | | | |
|---|---|---|---|---|
| 7,071,756 | B1* | 7/2006 | Vadi | G06F 1/04 327/296 |
| 7,124,334 | B2* | 10/2006 | Kashiwakura | H04L 43/50 714/712 |
| 7,209,907 | B2* | 4/2007 | Cherukuri | H04L 7/005 706/45 |
| 7,546,494 | B2* | 6/2009 | Haas | H04L 25/14 714/716 |
| 8,160,121 | B2* | 4/2012 | Forenza | H04L 1/007 375/267 |
| 8,559,492 | B2* | 10/2013 | Shin | H04L 25/0272 375/228 |
| 8,724,483 | B2* | 5/2014 | Ku | G01R 31/31716 710/31 |
| 9,225,507 | B1* | 12/2015 | Lye | H03L 7/235 |
| 9,395,744 | B2* | 7/2016 | Benjamini | H04L 25/14 |
| 9,871,530 | B1* | 1/2018 | La Grou | H03M 1/68 |
| 2007/0026809 | A1 | 2/2007 | Zhang et al. | |
| 2012/0192043 | A1 | 7/2012 | Jiang et al. | |

FOREIGN PATENT DOCUMENTS

| | | |
|---|---|---|
| CN | 111600606 A | 8/2020 |
| KR | 20070023578 A | 2/2007 |

OTHER PUBLICATIONS

International Search Report for corresponding application PCT/CN2022/081859 filed Mar. 19, 2022; Mail date Jul. 29, 2022.
Written Opinion for corresponding application PCT/CN2022/081859 filed Mar. 19, 2022; Mail date Jul. 29, 2022.

* cited by examiner

SAMPLING CIRCUIT, METHOD FOR USING SAMPLING CIRCUIT, STORAGE MEDIUM, AND ELECTRONIC DEVICE

The present disclosure is a national stage filing under 35 U.S.C. § 371 of international application number PCT/CN2022/081859, filed Mar. 10, 2022, which claims the priority to Chinese Patent Application No. 202111355645.3, filed to the China National Intellectual Property Administration on 16 Nov. 2021 and entitled "Sampling Circuit, Method for Using Sampling Circuit, Storage Medium, and Electronic Device", which is incorporated herein by reference in its entirety.

TECHNICAL FIELD

The embodiments of the present disclosure relate to the field of communications, and in particular, to a sampling circuit, a method for using a sampling circuit, a storage medium, and an electronic device.

BACKGROUND

With the development of the 5G communication technology and the advancement of the integrated circuit technology, the capacity and performance of the radio-frequency transceiving system are greatly improved, correspondingly, the requirements on design difficulty and stability of a system are also higher and higher, and therefore, as the main guarantee means of chip design, the verification and testing circuit can meet the requirements of function debugging and performance verification of various parts of the system by means of its low design cost, area and power consumption, facilitates fault tracing and locating in practical applications of chips, supports fast application and verification of users, and thus occupies an increasingly important position in design. Data sampling, as one of the main verification and testing means, is widely applied in verification and testing circuits, while two-point synchronous sampling is an important method in data sampling, and is of great significance for performing algorithm calibration tracking, link data and time delay analysis, etc. Traditional two-point synchronous sampling is to generate two sampling control signals for sampling after software sampling enable signals are respectively synchronized in clock domains of two sampling points, and this sampling structure is relatively simple, but has the following problems:

1. The synchronous constraint of the digital backend clock is complex. If the clock domain where the two sampling points are located is a synchronous clock domain, synchronization processing needs to be performed on a clock of the synchronous clock domain during backend design, and Static Timing Analysis (STA) is performed to ensure a time sequence. In this way, the synchronization states of sampling clocks on the same software sampling enable signal are the same, and complete synchronous sampling can be ensured. At present, with the increase of the integration degree of a radio-frequency transceiving system, for a plurality of links, the backend design complexity of clock synchronization processing is higher and higher, and the increasing cost of area and power consumption brought about thereby is also higher and higher.
2. The analysis process of the sampling data is complex. If the two sampling points are in asynchronous clock domains, the two-point sampling cannot be completely synchronized, and it can only be ensured that the initial synchronization relationship of the two-point sampling data is determined. The synchronization states of the same software sampling enable signal in the asynchronous clock domains may be different by one clock cycle, in this way, after each sampling, the matching relationship of the sampled data needs to be determined through a large number of complex data correlation algorithms, the entire process is time-consuming and cumbersome, which makes it very lagging and restrictive for solving problems when being used as verification and testing means.

No effective solution has been proposed for the problems in the related art of complex sampling digital backend synchronization design of two-point sampling and complex analysis process of sampling data.

SUMMARY

The embodiments of the present disclosure provide a sampling circuit, a method for using the sampling circuit, a storage medium, and an electronic device, so as to at least solve the problems in the related art of the complexity in the digital backend synchronization design of dual-point synchronous sampling and the complexity of the sampling data analysis process.

According to an embodiment of the present disclosure, provided is a sampling circuit, comprising: a generator, connected to a link loopback pulse signal transmission module and configured to generate a first loopback pulse signal; a loopback selection module, connected to the link loopback pulse signal transmission module and configured to establish a plurality of loopback links according to a pre-configured connection combination; the link loopback pulse signal transmission module, configured to receive the first loopback pulse signal sent by the generator, and transmit the first loopback pulse signal in the plurality of established loopback links, wherein the first loopback pulse signal and first link data are transmitted synchronously in the plurality of loopback links; a loopback sampling module, connected to the link loopback pulse signal transmission module and configured to determine, from the plurality of loopback links, a target loopback link on which sampling is to be performed, and sample first link data that is on the target loopback link and passes through a target sampling point, so as to obtain second link data; and a sampling storage module, connected to the loopback sampling module and configured to store sampling data in a random access memory, wherein the sampling data comprises: the second link data and the first loopback pulse signal.

According to an embodiment of the present disclosure, further provided is a method for using a sampling circuit, comprising: acquiring a first loopback pulse signal generated by a generator, and transmitting the first loopback pulse signal in a plurality of loopback links established according to a pre-configured connection combination, wherein the first loopback pulse signal and first link data are transmitted synchronously in the plurality of loopback links; determining, from the plurality of loopback links, a target loopback link on which sampling is to be performed, and sampling first link data that is on the target loopback link and passes through a target sampling point, so as to obtain second link data; and determining sampling data according to the second link data and the first loopback pulse signal, and storing the sampling data in a random access memory.

According to another embodiment of the present disclosure, further provided is a computer readable storage medium storing a computer program, wherein the computer program is configured to execute, when running, the steps in any one of the described method embodiments.

According to another embodiment of the present disclosure, further provided is an electronic device, comprising a memory and a processor, wherein the memory stores a computer program, and the processor is configured to run the computer program to execute the steps in any one of the method embodiments.

In the present disclosure, with a sampling circuit comprising: a generator, connected to a link loopback pulse signal transmission module and configured to generate a first loopback pulse signal; a loopback selection module, connected to the link loopback pulse signal transmission module and configured to establish a plurality of loopback links according to a pre-configured connection combination; the link loopback pulse signal transmission module, configured to receive the first loopback pulse signal sent by the generator, and transmit the first loopback pulse signal in the plurality of established loopback links, wherein the first loopback pulse signal and first link data are transmitted synchronously in the plurality of loopback links; a loopback sampling module, connected to the link loopback pulse signal transmission module and configured to determine, from the plurality of loopback links, a target loopback link on which sampling is to be performed, and sample first link data that is on the target loopback link and passes through a target sampling point, so as to obtain second link data; and a sampling storage module, connected to the loopback sampling module and configured to store sampling data comprising the second link data and the first loopback pulse signal in a random access memory, the link data transmitted in the chip is sampled, and the initial synchronization relationship determined by the two-point sampling data is realized, without a complex digital backend synchronization design to ensure the sampling delay, thus, the circuit area and power consumption are greatly saved. By means of synchronous transmission and fixed delay after alignment of a loopback pulse signal and link data, fixed-delay two-point synchronous sampling of full route combination selection of multiple digital links and multiple sampling points is realized, thereby eliminating the uncertainty of one clock cycle when synchronous sampling is enabled in a traditional synchronous two-point sampling mode. The technical solution solves the problems in the related art of the complexity in the digital backend synchronization design of dual-point synchronous sampling and the complexity of the sampling data analysis process.

DETAILED DESCRIPTION OF THE EMBODIMENTS

The embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or order.

Figure 1:
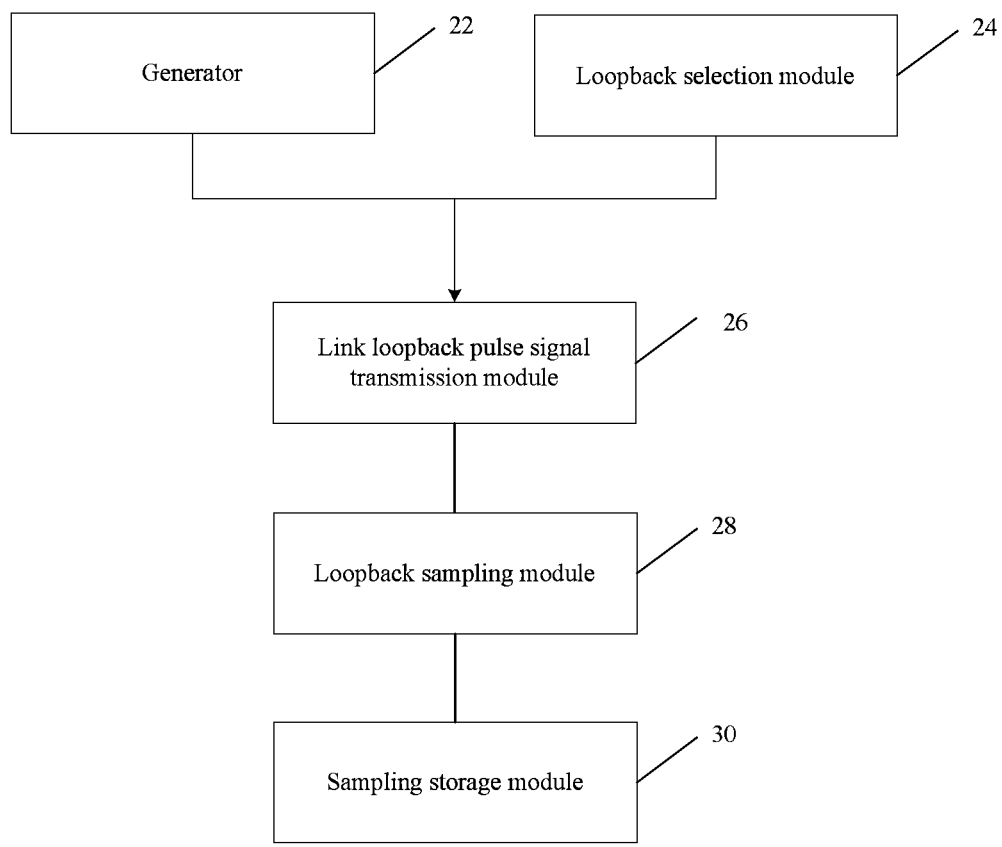
FIG. 1 is a block diagram of a sampling circuit according to an embodiment of the present disclosure.

Provided in the present embodiment is a sampling circuit for sampling on a chip. FIG. 1 is a structural block diagram of a sampling circuit according to an embodiment of the present disclosure. As shown in FIG. 1, the sampling circuit comprises the following circuits:

a generator 22, connected to a link loopback pulse signal transmission module 26 and configured to generate a first loopback pulse signal;

a loopback selection module 24, connected to the link loopback pulse signal transmission module 26 and configured to establish a plurality of loopback links according to a pre-configured connection combination, that is to say, a plurality of link types in the link loopback pulse signal transmission module can be combined for connection by means of the loopback selection module, and then a plurality of loopback links capable of transmitting link data can be established in the link loopback pulse signal transmission module;

the link loopback pulse signal transmission module 26, configured to receive the first loopback pulse signal sent by the generator, and transmit the first loopback pulse signal in the plurality of established loopback links, wherein the first loopback pulse signal and first link data are transmitted synchronously in the plurality of loopback links;

a loopback sampling module 28, connected to the link loopback pulse signal transmission module 26 and configured to determine, from the plurality of loopback links, a target loopback link on which sampling is to be performed, and sample first link data that is on the target loopback link and passes through a target sampling point, so as to obtain second link data; and a sampling storage module 30, connected to the loopback sampling module 28 and configured to store sampling data in a random access memory, wherein the sampling data comprises: the second link data and the first loopback pulse signal.

In the present disclosure, with a sampling circuit comprising: a generator, connected to a link loopback pulse signal transmission module and configured to generate a first loopback pulse signal; a loopback selection module, connected to the link loopback pulse signal transmission module and configured to establish a plurality of loopback links according to a pre-configured connection combination; the link loopback pulse signal transmission module, configured to receive the first loopback pulse signal sent by the generator, and transmit the first loopback pulse signal in the plurality of established loopback links, wherein the first loopback pulse signal and first link data are transmitted synchronously in the plurality of loopback links; a loopback sampling module, connected to the link loopback pulse signal transmission module and configured to determine, from the plurality of loopback links, a target loopback link on which sampling is to be performed, and sample first link data that is on the target loopback link and passes through a target sampling point, so as to obtain second link data; and a sampling storage module, connected to the loopback sampling module and configured to store sampling data comprising the second link data and the first loopback pulse signal in a random access memory, the link data transmitted in the chip is sampled, and the initial synchronization relationship determined by the two-point sampling data is realized, without a complex digital backend synchronization design to ensure the sampling delay, thus, the circuit area and power consumption are greatly saved. By means of synchronous transmission and fixed delay after alignment of a loopback pulse signal and link data, fixed-delay two-point synchronous sampling of full route combination selection of multiple digital links and multiple sampling points is realized, thereby eliminating the uncertainty of one clock cycle when synchronous sampling is enabled in a traditional synchronous two-point sampling mode. The technical solution solves the problems in the related art of complex sampling digital backend synchronization design of two-point sampling and complex analysis process of sampling data.

In an exemplary embodiment, the generator further comprises: a first register, the first register being configured to configure a pulse interval of the first loopback pulse signal, wherein the pulse interval is used for indicating a time interval that is from the end of a current pulse to the arrival of a next pulse and that is determined according to a clock domain of the sampling frequency when a sampling frequency to be executed for the first link data has been determined, the pulse interval being a clock period of N clock domains, and N being a positive integer.

In an exemplary embodiment, the generator further comprises: a filter, configured to perform a configurable multiple expansion processing on the loopback pulse signal according to a sampling ratio relationship between an input data and an output data of the filter, wherein the sampling ratio relationship is used for indicating a data change ratio, when the first loopback pulse signal and the first link data are synchronously transmitted in the loopback link, of the first link data after being processed by the filter.

In an exemplary embodiment, the link loopback pulse signal transmission module further comprises a plurality of clock domains, and the plurality of clock domains at least comprise one of the following: a clock domain through which the link data passes during transmission, a clock domain corresponding to a high-speed digital-to-analog converter through which the link data passes, and a clock domain corresponding to a high-speed analog-to-digital converter through which the link data passes.

In an exemplary embodiment, the link loopback pulse signal transmission module comprises at least one of the following: a sending link loopback pulse signal transmission module, a receiving link loopback pulse signal transmission module, and a feedback link loopback pulse signal transmission module; wherein the sending link loopback pulse signal transmission module is configured to determine the first loopback pulse signal generated by the generator; and the receiving link loopback pulse signal transmission module and the feedback link loopback pulse signal transmission module are configured to acquire a second loopback pulse signal after the first loopback pulse signal is transmitted, and determine a pulse signal difference between the first loopback pulse signal and the second loopback pulse signal, wherein the second loopback pulse signal is a pulse signal obtained after the first loopback pulse signal is transmitted synchronously with the first link data.

In an exemplary embodiment, the loopback selection module comprises a data selector and an FIFO memory, wherein the data selector is configured to select clocks of the high-speed digital-to-analog converter and high-speed analog-to-digital converter corresponding to the plurality of loopback links established by means of the pre-configured connection combination, determine a first loopback pulse signal to be transmitted in the loopback links, and take the clock and the first loopback pulse signal as the read/write clock and data of the FIFO memory; and the FIFO memory is configured to control a transmission direction of the first loopback pulse signal, and store the clock and the first loopback pulse signal.

In an exemplary embodiment, the loopback sampling module further comprises: a sampling selection unit, configured to perform three-level selection on a plurality of first sampling points to obtain target sampling points, wherein the three-level selection comprises: determining a plurality of link types included in the target loopback links; determining, from the plurality of first sampling points, a sampling point corresponding to each link type among the plurality of link types; when a plurality of links exist simultaneously under the link type, selecting a sampling link from the plurality of links; performing selection on the plurality of link types according to a preset selection rule, determining a target link type for sampling, determining a target loopback link corresponding to the target link type, and determining a target sampling point; and a synchronization control unit, configured to acquire the target sampling point determined by the data selection unit, and compare an enabling signal corresponding to the target sampling point with the first loopback pulse signal for determination.

Figure 4:
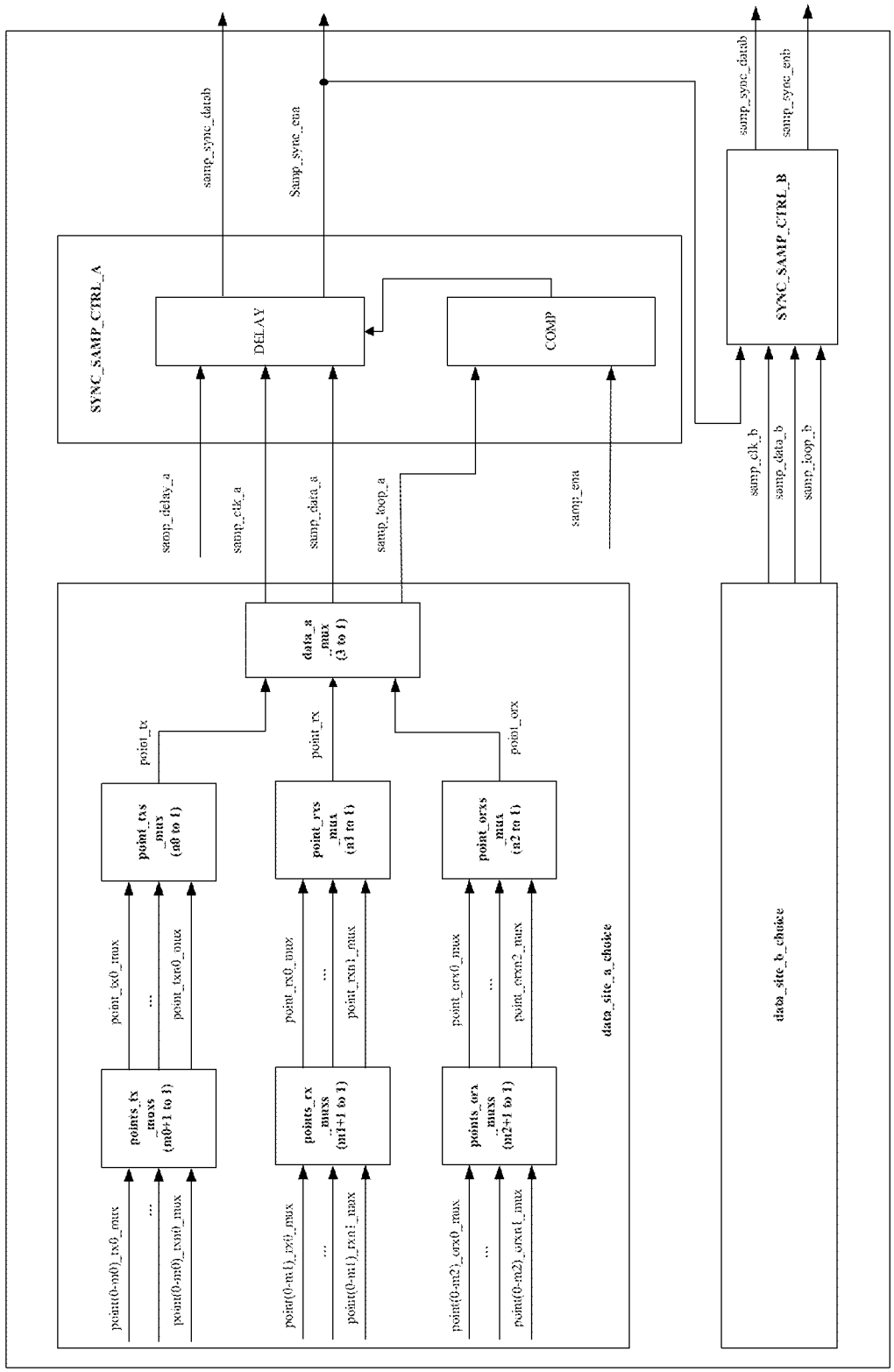
FIG. 4 is a schematic structural diagram of a loopback signal sampling module according to an optional embodiment of the present disclosure.

For example, as shown in FIG. 4, when it is required to perform synchronous sampling on two sampling points A and B, a sampling clock, a loopback pulse signal and link data of the sampling points will select data_site_a_choice at sampling point A, select data_site_b_choice at sampling point B, and perform respective three-level selection under the same circuit structure. Optionally, the first-level point-s_tx(rx/orx)_muxs is selection of a sampling point: selecting one sampling point from (m0(m1/m2)+1) sampling points of each TX, RX, and ORX link; optionally, the second-level point_txs(rxs/orxs)_mux is selection of a sampling link: selecting one sampling link from the n0, n1 and n2 links of TX, RX and ORX; optionally, the third-level data_a(b)_mux is selection of a link type: the 3-to-1 MUX selects one type of TX, RX, or ORX, and outputs the final sampling clock, loopback pulse signal and link sampling data of A(B) to the SYNC_SAMP_CTRL_A(B) module to perform synchronous sampling at points A(B).

In order to better understand the sampling circuit, the described technical solutions will be described below in combination with exemplary embodiments, but are not intended to limit the technical solutions of the embodiments of the present disclosure.

Figure 2:
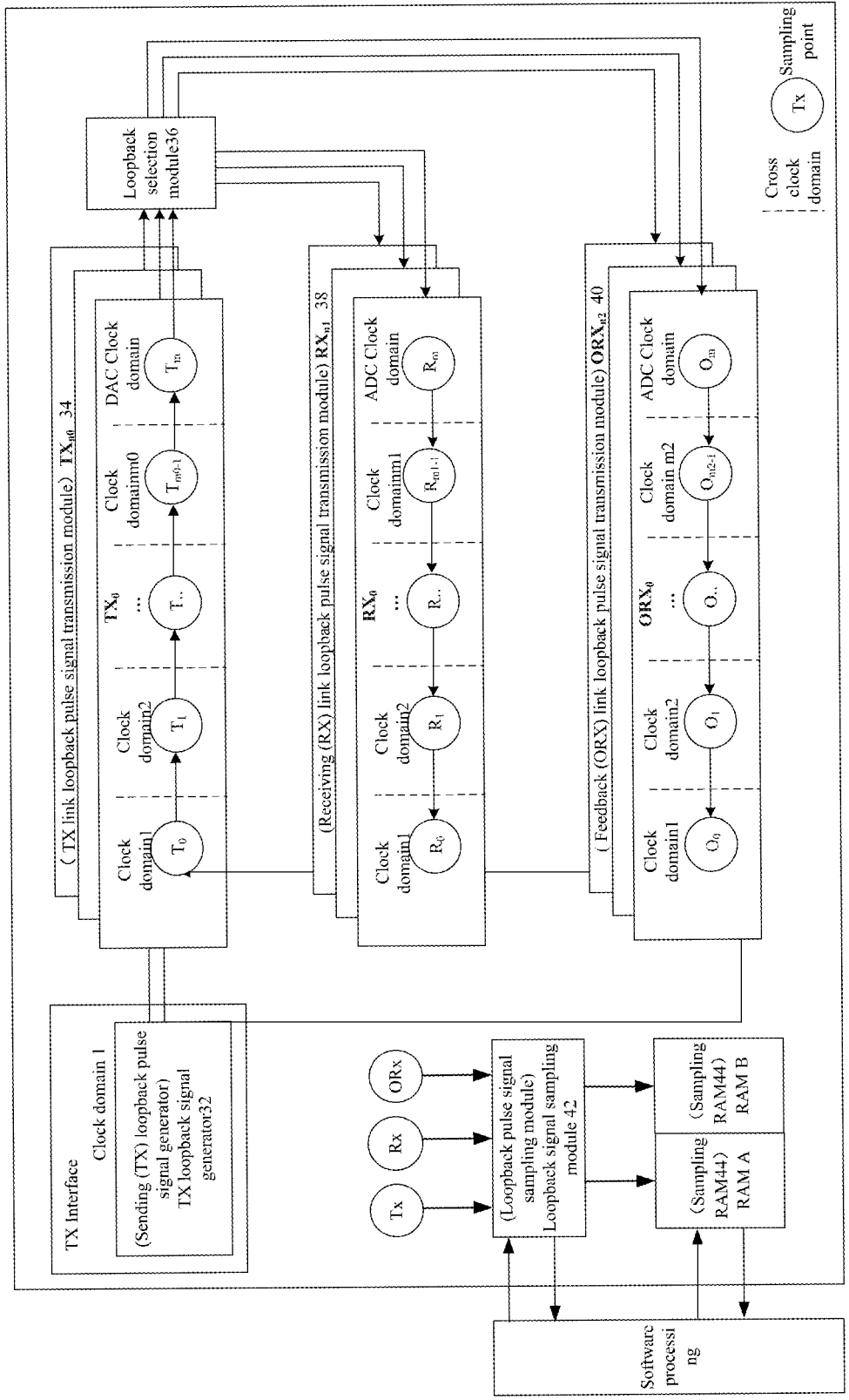
FIG. 2 is a schematic structural diagram of a multi-link two-point synchronous sampling circuit according to an optional embodiment of the present disclosure.

An optional embodiment of the present disclosure provides a multi-link two-point synchronous sampling circuit. FIG. 2 is a schematic structural diagram of a multi-link two-point synchronous sampling circuit, comprising:

a sending (TX) loopback pulse signal generator 32, a TX link loopback pulse signal transmission module 34, a loopback selection module 36, a receiving (RX) link loopback pulse signal transmission module 38, a feedback (ORX) link loopback pulse signal transmission module 40, a loopback pulse signal sampling module 42 and a sampling Random Access Memory (RAM) 44.

Optionally, when the sampling circuit is running, a loopback pulse signal is generated in the TX loopback pulse signal generator, a link loopback selection is performed after the loopback pulse signal passes through sampling points of each TX link, and the loopback pulse signal enters the RX/ORX links and sequentially passes through sampling points of each the RX/ORX link to form a loop. Specifically, during transmission, the loopback pulse signal and the link data pass through the multi-clock domain of the link together, and are aligned and transmitted with the data by using a data valid enable signal; therefore, the cross-clock domain synchronization states of the loopback pulse signal and the link data are kept consistent, and can be used to control synchronous sampling.

Figure 3:
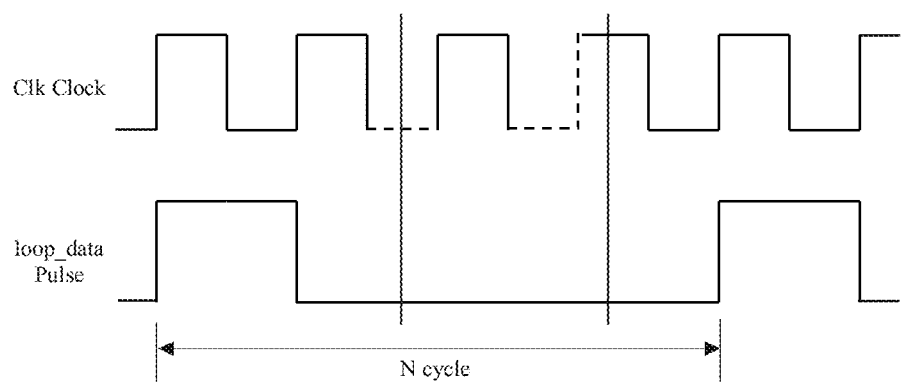
FIG. 3 is a schematic diagram of a loopback pulse signal composition according to an optional embodiment of the present disclosure.

As an optional implementation, the composition of a loopback pulse signal generated by the TX loopback pulse signal generator 32 is shown in FIG. 3, wherein in a clock domain of a fixed sampling frequency, a pulse interval is determined, and is N clock periods in the clock domain, and this is also the period of the loopback pulse signal; in different clock domains, the value N of the pulse interval is different, but the period of the loopback pulse signal is the same, and there is a high level signal for only one clock period. The loopback pulse signal may not only avoid analysis of diversity of extraction values and interpolation values of multi-bit data in link transmission, but also determine a sampling start delay relationship and a sampling period by means of a fixed delay between sampling points during transmission. The specific value N of the loopback pulse signal is configured by a register, so as to adapt to a synchronization requirement between two points. The value N is generally an integral multiple of a proportional relationship between sampling clock frequencies. For example, for operating frequencies of 983.04 MHz and 737.28 MHz, a corresponding value N may be an integral multiple of 4 and 3 respectively.

In working scenarios of different transceiving bandwidths, different processes, such as interpolation and extraction, are performed on link data when the link data passes through a filter; configurable multiple expansion processing is performed on the loopback pulse signal according to a sampling ratio relationship between input and output data of the filter; and by means of data valid enable signal control, alignment between the loopback pulse signal and the valid data signal is ensured, and the loopback pulse signal and the valid data signal are synchronously transmitted to a subordinate circuit. When crossing the clock domains, the loopback pulse signal and the data pass through the First Input First Output (FIFO) together, so as to continue to ensure the synchronization relationship between the loopback pulse signal and the data.

The loopback selecting module 36 may implement a full-routing loopback connection between the TX link and the RX (ORX) link, thereby implementing synchronous sampling of link data of different flow directions under associated control of the loopback pulse signal. The basic circuit structure of the loopback selection module consists of a data selector (MUX) and an FIFO; the MUX is configured by a software register, and selects a TX link DAC clock and a loopback pulse signal, and an RX (ORX) link ADC clock and a loopback pulse signal to respectively serve as the read-write clock and data of the FIFO, so as to achieve a mapping relationship between the TX link and the RX (ORX) link; like the cross-clock domain transmission, the FIFO controls the transmission direction, so as to realize the cross-channel transmission of the loopback pulse signal. According to actual system structure and sampling requirements, MUXs of different specifications can be selected or different numbers of basic circuit structures can be multiplexed, so as to implement optimal hardware configuration of the mapping relationship.

As an optional implementation, FIG. 4 is a schematic structural diagram of a loopback signal sampling module circuit. A sampling clock, a loopback pulse signal and link data of each sampling point perform respective three-level selection under the same circuit structure of data_site_a_choice and data_site_b_choice.

Optionally, the first-level points_tx(rx/orx)_muxs is selection of a sampling point: selecting one sampling point from (m0(m1/m2)+1) sampling points of each TX, RX, and ORX link.

Optionally, the second-level point_txs(rxs/orxs) mux is selection of a sampling link: selecting one sampling link from the n0, n1 and n2 links of TX, RX and ORX.

Optionally, the third-level data_a(b)_mux is selection of a link type: the 3-to-1 MUX selects one type of TX, RX, or ORX, and outputs the final sampling clock, loopback pulse signal and link sampling data of A(B) to the SYNC_SAMP_CTRL_A(B) module to perform synchronous sampling at points A(B).

Figure 5:
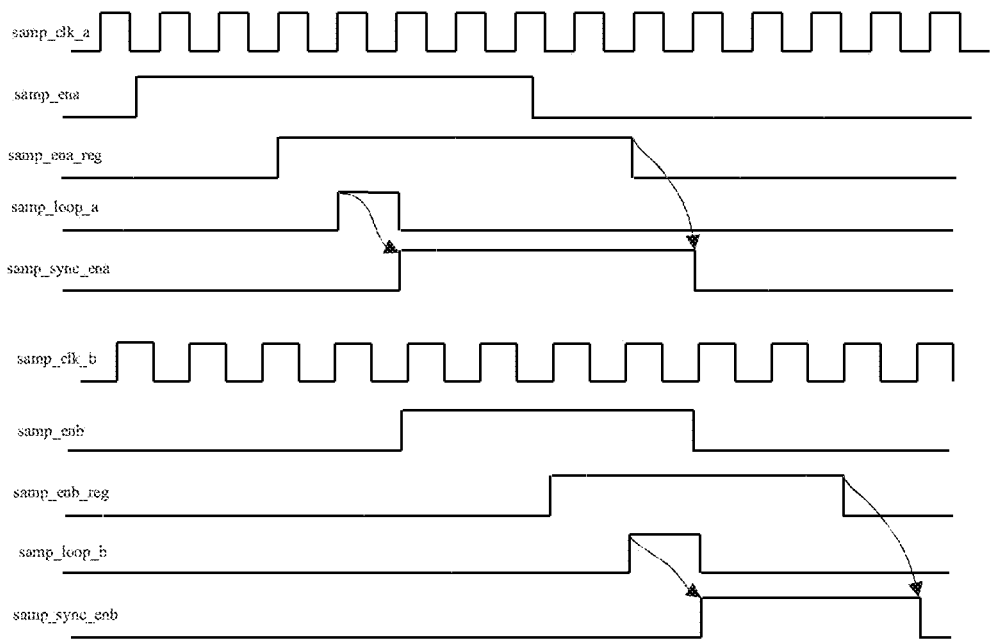
FIG. 5 is a timing diagram of two-point synchronous sampling control according to an optional embodiment of the present disclosure.

Optionally, FIG. 5 is a timing diagram of two-point synchronous sampling control according to an optional embodiment of the present disclosure, for the point A, when the software configuration sampling enable signal smp_ena is synchronized in the sampling clock domain to take effect, the COMP circuit will start to detect the loopback pulse signal value of the point A. After a pulse samp_loop_a reaches point A, taking same as a starting time, after a delay of a configured samp_delay_a value for a determined time, samp_sync_ena is generated to start the sampling of point A, and data is stored in a RAM A; for point B, samp_sync_ena of point A is used as samp_enb of point B to perform synchronization enabling, after the COMP circuit of point B completes detection of the arrival of the samp_loop_b, the time of the samp_delay_b is delayed to generate samp_sync_enb, to start the sampling of point B, and data is stored in the RAM B. Since the transmission delay of the loopback pulse signal between two points A and B is fixed, and the cycle of the loopback pulse signal can match the samp_delay between the two points A and B, it can be ensured that the delay difference between final sampling enable signals samp_sync_ena and samp_sync_enb of the two points A and B is determined, thereby realizing synchronous sampling of two points at a fixed interval.

Figure 6:
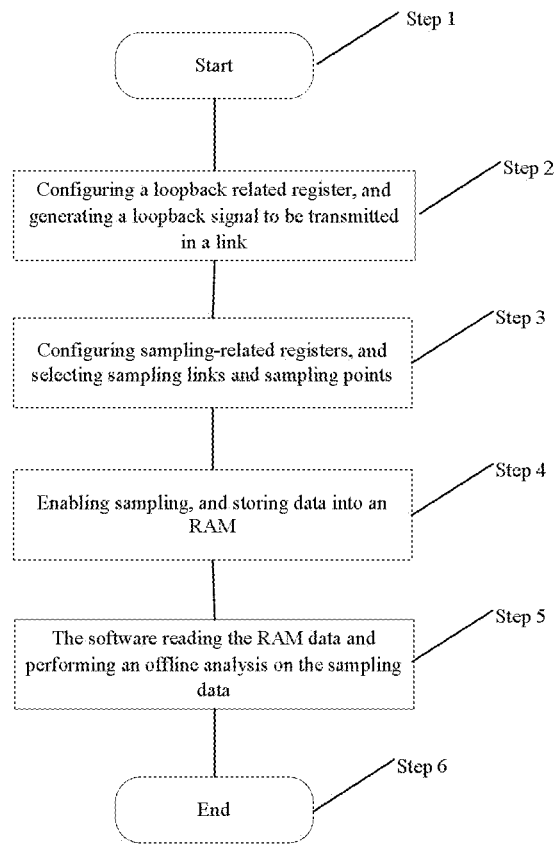
FIG. 6 is a schematic flowchart of link two-point synchronous sampling according to an optional embodiment of the present disclosure.

An optional embodiment of the present disclosure further provides a link two-point synchronous sampling flow. FIG. 6 shows a link two-point synchronous sampling flow, and the specific steps are as follows:

step 1, according to the verification and testing requirements of an actual chip, starting link two-point synchronous sampling;

step 2, according to a working scenario of a product application, configuring a loopback related register, such as a loopback pulse interval and a loopback link selection, by means of software; generating a loopback signal to be transmitted in a link, for example, a TX loopback pulse signal generator generates a pulse circularly, and transmits same in a loop composed of links with a configured connection relationship;

step 3, according to an actual synchronous two-point sampling requirement, configuring, by means of software, sampling-related registers, such as a sampling link, sampling point selection, samp_delay and the number of pieces of sampling data;

step 4, enabling sampling, storing data into an RAM, starting two-point synchronous sampling by means of software, and respectively storing the two-point sampling data in two sampling RAMs;

step 5, the software reading the RAM data and performing an offline analysis on the sampling data, and optionally, after detecting that two-point synchronous sampling is completed, the software starting to read the RAM data and performing a two-point sampling data analysis;

step 6, the software sampling process ending.

It should be noted that, if there is no need for the scale of a circuit and for interactive sampling between the TX link and the RX\ORX link in a scenario, the loopback selection module can be removed, and a complete loopback circuit is established on each single TX\RX\ORX link, comprising a pulse signal generator, a link transmission module and a loopback signal sampling module; for the three-level selection of A/B sampling in the loopback signal sampling module, the hierarchical structure and order of the MUX can be adjusted according to the actual system structure and requirements. For example, if there is no need for interactive sampling of the TX link and the RX/ORX link, the third-level link type selection may be removed; the selection order may be adjusted from sample point selection->>link selection->>type selection to be link selection->>sample point selection->>type selection, etc.

Optionally, on the basis of a configurable loopback pulse signal, the present disclosure proposes a loopback two-point synchronous sampling circuit of a digital link, which has a simple structure, and is adaptable to working modes such as a Time-Division Duplex (TDD) mode and a Frequency-Division Duplex (FDD) mode and application scenarios of different transmission and reception bandwidths, so as to realize the two-point synchronous sampling of full-routing combination selection of multiple digital links and multiple sampling points. Based on the synchronous transmission and fixed delay after the loopback pulse signal is aligned with the link data, the sampling circuit of the present disclosure uses, at two sampling points, the loopback pulse signal synchronized with the clock to replace the asynchronous software sampling enable signal, and generates the synchronized sampling control signal for sampling. In this way, the initial synchronization relationship determined by the two-point sampling data can be achieved without complex digital backend synchronization design, thereby greatly saving the circuit area and power consumption.

Optionally, the present disclosure further provides a sampling processing method based on the loopback two-point synchronous sampling circuit, which not only eliminates the uncertainty of the accuracy of one clock cycle when synchronous sampling is enabled in the traditional synchronous two-point sampling mode, but also increases the configurable delay setting, so as to satisfy the adjustment and fault tolerance of various synchronous sampling application requirements. The sampling method of the present disclosure expands the application scope of a two-point synchronous sampling circuit, avoids a great deal of algorithm calculations, and makes the sampling process more convenient and flexible.

It can be understood that the present disclosure is applied to a radio-frequency transceiving system, and supports synchronous sampling of any two sampling points in a multi-link, multi-clock domain and a multi-application scenario. The present invention mainly relates to a two-point synchronous sampling technology for a multi-channel digital link in a radio-frequency transceiver system in the field of 5G communication, is applicable to a transceiver system having a high sampling synchronization precision requirement and having a cross-clock domain or an asynchronous clock domain, and can be popularized and applied to a radio-frequency chip, a terminal chip and a baseband chip having corresponding requirements.

By means of the technical solution, an optional embodiment of the present disclosure proposes the two-point synchronous sampling circuit and the sampling method, by combining hardware and software, the traditional way of a software sampling enable signal directly generating synchronous two-point sampling enable to control sampling is replaced by performing overall control by the software sampling enable signal and direct control by a loopback pulse signal, so as to realize the initial synchronization relationship determined by the two-point sampling data, and the sampling delay is not ensured by means of a complex digital backend synchronization design, thereby greatly saving the circuit area and power consumption; in addition, the two-point synchronous sampling circuit and the sampling method thereof utilize the synchronous transmission and the fixed delay after the loop back pulse signal and the link data are aligned, implementing the fixed-delay two-point synchronous sampling selected by the full-routing combination of multiple digital links and multiple sampling points, thereby eliminating the uncertainty of one clock cycle when synchronous sampling is enabled in a traditional synchronous two-point sampling mode, and solving the problems of complexity and hysteresis caused by the fact that a large deal of tedious algorithm calculation and analysis needs to be performed each time when sampling is performed. In addition, configurable designs, such as a sampling delay, are added, which can be applied to a variety of synchronous sampling requirements and adjustments, thereby solving the problem that the method is limited when being used as a verification and testing means.

Figure 7:
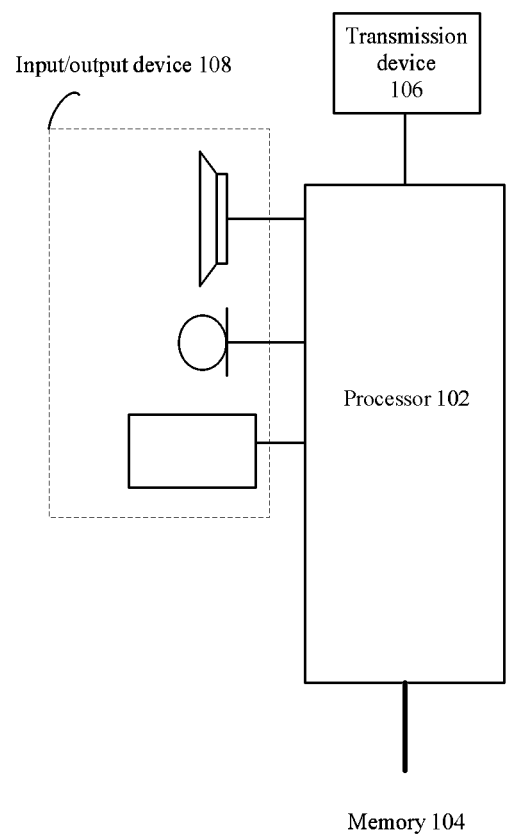
FIG. 7 is a hardware structure block diagram of a computer terminal of a method for using a sampling circuit according to an optional embodiment of the present disclosure.

The method embodiment provided in the embodiment I of the present application may be executed in a computer terminal or a similar computing device. Taking running on a computer terminal as an example, FIG. 7 is a hardware structure block diagram of a computer terminal in a method for using a sampling circuit according to an embodiment of the present disclosure. As shown in FIG. 7, the computer terminal may include one or more (only one is shown in FIG. 1) processors 102 (the processors 102 may include, but are not limited to, a microprocessor MCU or a processing device such as a programmable logic device FPGA) and a memory 104 configured to store data, wherein the computer terminal can further include a transmission device 106 for a communication function and an input/output device 108. Those ordinarily skilled in the art can appreciate that the structure shown in FIG. 7 is for illustrative purposes only, but not limit the structure of the computer terminal. For example, the computer terminal may also include more or fewer components than those shown in FIG. 7, or have different configurations from that shown in FIG. 7.

The memory 104 may be configured to store a computer program, for example, a software program and a module of application software, such as a computer program corresponding to the method for using a sampling circuit in the embodiments of the present disclosure. The processor 102 runs the computer program stored in the memory 104, so as to execute various function applications and data processing, that is, to implement the foregoing method. The memory 104 may include a high-speed random access memory, and may also include anon-transitory memory, such as one or more magnetic storage apparatuses, flash memories, or other non-transitory solid-state memories. In some instances, the memory 104 may further include a memory remotely located from the processor 102, and the remote memory may be connected to the computer terminal by a network. Examples of the network above includes, but is not limited to, an Internet, intranets, a local area network, a mobile communication network, and combinations thereof.

The transmission device 106 is configured to receive or transmit data by a network. Specific examples of the network may include a wireless network provided by a communication provider of the computer terminal. In one example, the transmission device 106 includes a network interface controller (NIC) which may be connected to other network devices by means of a base station, thereby being able to communicate with the Internet. In one example, the transmission device 106 may be a radio-frequency (RF) module for communicating wirelessly with the Internet.

Figure 8:
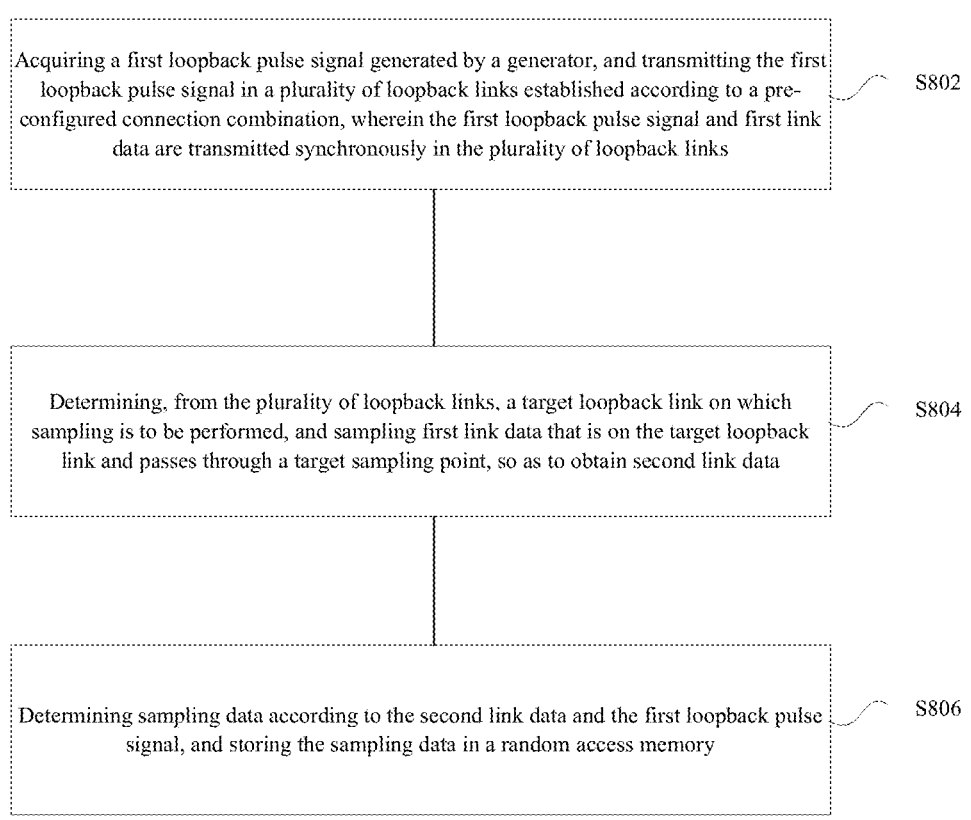
FIG. 8 is a flowchart of a method for using a sampling circuit according to an embodiment of the present disclosure.

The present embodiment further provides a method for using a sampling circuit. FIG. 8 is a flowchart of a method for using a sampling circuit according to an embodiment of the present disclosure. As shown in FIG. 8, the method comprises the following steps:

step S802: acquiring a first loopback pulse signal generated by a generator, and transmitting the first loopback pulse signal in a plurality of loopback links established according to a pre-configured connection combination, wherein the first loopback pulse signal and first link data are transmitted synchronously in the plurality of loopback links;

step S804: determining, from the plurality of loopback links, a target loopback link on which sampling is to be performed, and sampling first link data that is on the target loopback link and passes through a target sampling point, so as to obtain second link data; and step S806: determining sampling data according to the second link data and the first loopback pulse signal, and storing the sampling data in a random access memory.

By means of the present disclosure, acquiring a first loopback pulse signal generated by a generator, and transmitting the first loopback pulse signal in a plurality of loopback links established according to a pre-configured connection combination, wherein the first loopback pulse signal and first link data are transmitted synchronously in the plurality of loopback links; determining, from the plurality of loopback links, a target loopback link on which sampling is to be performed, and sampling first link data that is on the target loopback link and passes through a target sampling point, so as to obtain second link data; and determining sampling data according to the second link data and the first loopback pulse signal, and storing the sampling data in a random access memory, that is, the link data transmitted in the chip is sampled by a sampling circuit composed of the described apparatuses, the initial synchronization relationship determined by the two-point sampling data is realized, and the sampling delay is not ensured by means of a complex digital backend synchronization design, thus, the circuit area and power consumption are greatly saved. By means of synchronous transmission and fixed delay after alignment of a loopback pulse signal and link data, fixed-delay two-point synchronous sampling of full route combination selection of multiple digital links and multiple sampling points is realized, thereby eliminating the uncertainty of one clock cycle when synchronous sampling is enabled in a traditional synchronous two-point sampling mode. The technical solution solves the problems in the related art of complex sampling digital backend synchronization design of two-point sampling and complex analysis process of sampling data.

In an exemplary embodiment, before acquiring the first loopback pulse signal generated by the generator, the method further comprises: configuring, on a first register, a pulse interval of the first loopback pulse signal; and adjusting, according to the pulse interval, a time interval between any two pulses corresponding to the first loopback pulse signal, wherein the pulse interval is used for indicating a time interval that is from the end of a current pulse to the arrival of a next pulse and that is determined according to a clock domain of the sampling frequency when a sampling frequency to be executed for the first link data has been determined, the pulse interval being a clock period of N clock domains, and N being a positive integer.

In an exemplary embodiment, after determining sampling data according to the second link data and the first loopback pulse signal, and storing the sampling data in a random access memory, the method further comprises: in cases where there are at least two target sampling points, comparing a difference between first sampling data corresponding to a first target sampling point and second sampling data corresponding to a second target sampling point in the random access memory; and determining, according to the difference, whether the transmission of first link data on the target loopback link between the target sampling points is normal.

In an exemplary embodiment, before transmitting the first loopback pulse signal on a plurality of loopback links established on the basis of the pre-configured connection combination, the method further comprises: selecting clocks of the high-speed digital-to-analog converter and the high-speed analog-to-digital converter corresponding to the plurality of loopback links by using a data selector in the loopback selection module, determining a first loopback pulse signal to be transmitted in the plurality of loopback links, and using the clock and the first loopback pulse signal as a read/write clock and data of the FIFO memory.

In an exemplary embodiment, before determining, from the plurality of loopback links, a target loopback link on which sampling is to be performed, and sampling first link data that is on the target loopback link and passes through a target sampling point, the method further comprises: performing three-level selection on a plurality of first sampling points to obtain target sampling points, wherein the three-level selection comprises: determining a plurality of link types included in the target loopback links; determining, from the plurality of first sampling points, a sampling point corresponding to each link type among the plurality of link types; when a plurality of links exist simultaneously under the link type, selecting a sampling link from the plurality of links; performing selection on the plurality of link types according to a preset selection rule, determining a target link type for sampling, determining a target loopback link corresponding to the target link type, and determining a target sampling point; and comparing an enabling signal corresponding to the target sampling point with the first loopback pulse signal for determination.

For example, as shown in FIG. 4, when it is required to perform synchronous sampling on two sampling points A and B, a sampling clock, a loopback pulse signal and link data of the sampling points will select data_site_a_choice at sampling point A, select data_site_b_choice at sampling point B, and perform respective three-level selection under the same circuit structure. Optionally, the first-level points_tx(rx/orx)_muxs is selection of a sampling point: selecting one sampling point from (m0(m1/m2)+1) sampling points of each TX, RX and ORX link; optionally, the second-level point_txs(rxs/orxs)_mux is selection of a sampling link: selecting one sampling link from the n0, n1 and n2 links of TX, RX and ORX; optionally, the third-level data_a(b)_mux is selection of a link type: the 3-to-1 MUX selects one type of TX, RX, or ORX, and outputs the final sampling clock, loopback pulse signal and link sampling data of A(B) to the SYNC_SAMP_CTRL_A(B) module to perform synchronous sampling at points A(B).

It should be noted that the modules above may be implemented by software or hardware, and the latter may be implemented in the following manner, but is not limited thereto: the modules are located in the same processor; or the modules are located in different processors in an arbitrary combination.

The embodiments of the present disclosure further provide a computer readable storage medium storing a computer program, wherein the computer program is configured to execute, when running, the steps in any one of the described method embodiments.

In an exemplary embodiment, the computer readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor; the memory stores a computer program, and the processor is configured to run the computer program, so as to execute the operations in any one of the method embodiments.

In an exemplary embodiment, the electronic device can further comprise a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

Obviously, those skilled in the art should understand that the modules or steps in some embodiments of the present disclosure can be implemented by using a general computing device, and they can be integrated in a single computing device, and can also be distributed over a network consisting of a plurality of computing devices. They may be implemented by using executable program codes of the computing devices. Thus, they can be stored in a storage device and executed by the computing devices. Furthermore, in some cases, the shown or described steps may be executed in an order different from that described here, or they can be respectively implemented by individual Integrated Circuit modules, or they can be implemented by making a plurality of the modules or steps into a single Integrated Circuit module. Thus, the present disclosure is not limited to any specific hardware and software combinations.

The content above only relates to preferred embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

The invention claimed is:

1. A sampling circuit, comprising:
    a generator, connected to a link loopback pulse signal transmission module and configured to generate a first loopback pulse signal;
    a loopback selection module, connected to the link loopback pulse signal transmission module and configured to establish a plurality of loopback links according to a pre-configured connection combination;
    the link loopback pulse signal transmission module, configured to receive the first loopback pulse signal sent by the generator, and transmit the first loopback pulse signal in the plurality of loopback links that have been established, wherein the first loopback pulse signal and first link data are transmitted synchronously in the plurality of loopback links;
    a loopback sampling module, connected to the link loopback pulse signal transmission module and configured to determine, from the plurality of loopback links, a target loopback link on which sampling is to be performed, and sample a first link data that is on the target loopback link and passes through a target sampling point, so as to obtain second link data; and
    a sampling storage module, connected to the loopback sampling module and configured to store sampling data in a random access memory, wherein the sampling data comprises: the second link data and the first loopback pulse signal.

2. The sampling circuit according to claim 1, wherein the generator further comprises:
    a first register, configured to store a configured pulse interval of the first loopback pulse signal, wherein the pulse interval is used for indicating a time interval that is from the end of a current pulse to the arrival of a next pulse and that is determined according to a clock domain of a sampling frequency, when the sampling frequency to be executed for the first link data has been determined, the pulse interval being a clock period of N clock domains, and N being a positive integer.

3. The sampling circuit according to claim 1, wherein the generator further comprises:
    a filter, configured to perform configurable multiple expansion processing on the loopback pulse signal according to a sampling ratio relationship between an input data and an output data of the filter, wherein the sampling ratio relationship is used for indicating a data change ratio, when the first loopback pulse signal and the first link data are synchronously transmitted in the loopback link, of the first link data before and after being processed by the filter.

4. The sampling circuit according to claim 1, wherein the link loopback pulse signal transmission module further comprises a plurality of clock domains, and the plurality of clock domains at least comprise one of the following:
    a clock domain through which link data passes during transmission, a clock domain corresponding to a high-speed digital-to-analog converter through which the link data passes, and a clock domain corresponding to a high-speed analog-to-digital converter through which the link data passes.

5. The sampling circuit according to claim 1, wherein the link loopback pulse signal transmission module comprises at least one of the following: a sending link loopback pulse signal transmission module, a receiving link loopback pulse signal transmission module, and a feedback link loopback pulse signal transmission module; wherein the sending link loopback pulse signal transmission module is configured to receive the first loopback pulse signal generated by the generator;

the receiving link loopback pulse signal transmission module and the feedback link loopback pulse signal transmission module are configured to acquire a second loopback pulse signal after the first loopback pulse signal is transmitted, and determine a pulse signal difference between the first loopback pulse signal and the second loopback pulse signal, wherein the second loopback pulse signal is a pulse signal obtained after the first loopback pulse signal is transmitted synchronously with the first link data.

6. The sampling circuit according to claim 1, wherein the loop selection module comprises a data selector and an FIFO memory, wherein the data selector is configured to select a clock of a high-speed digital-to-analog converter and a high-speed analog-to-digital converter corresponding to the plurality of loopback links established according to the pre-configured connection combination, determine the first loopback pulse signal to be transmitted in the loopback links, and the clock is a read/write clock of the FIFO memory, and the first loopback pulse signal being is data of the FIFO memory;

the FIFO memory is configured to control a transmission direction of the first loopback pulse signal, and store the clock and the first loopback pulse signal.

7. The sampling circuit according to claim 1, wherein the loopback sampling module further comprises:

a sampling selection unit, configured to perform three-level selection on a plurality of first sampling points to obtain target sampling points, wherein the three-level selection comprises: determining a plurality of link types included in the target loopback links; determining, from the plurality of first sampling points, a sampling point corresponding to each link type among the plurality of link types; in the case where a plurality of links exist simultaneously under the link type, selecting a sampling link from the plurality of links; performing selection on the plurality of link types according to a preset selection rule, determining a target link type for sampling, determining a target loopback link corresponding to the target link type, and determining a target sampling point; and a synchronization control unit, configured to acquire the target sampling point determined by the data selection unit, and compare an enabling signal corresponding to the target sampling point with the first loopback pulse signal for determination.

8. A sampling method, performed by a sampling circuit as claimed in claim 1, comprising:

generating, by a generator, a first loopback pulse signal, and transmitting the first loopback pulse signal in a plurality of loopback links established according to a pre-configured connection combination, wherein the first loopback pulse signal and first link data are transmitted synchronously in the plurality of loopback links;

determining, from the plurality of loopback links, a target loopback link on which sampling is to be performed, and sampling the first link data that is on the target loopback link and passes through a target sampling point, so as to obtain second link data; and determining sampling data according to the second link data and the first loopback pulse signal, and storing the sampling data in a random access memory.

9. The method according to claim 8, wherein before generating the first loopback pulse signal, the method further comprises:

acquiring, from a first register, a configured pulse interval of the first loopback pulse signal; and adjusting, according to the pulse interval, a time interval between any two pulses corresponding to the first loopback pulse signal, wherein the pulse interval is used for indicating a time interval that is from the end of a current pulse to the arrival of a next pulse and that is determined according to a clock domain of the sampling frequency, when a sampling frequency to be executed for the first link data has been determined, the pulse interval being a clock period of N clock domains, and N being a positive integer.

10. The method according to claim 8, wherein after determining sampling data according to the second link data and the first loopback pulse signal, and storing the sampling data in a random access memory, the method further comprises:

in cases where there are at least two of the target sampling points, comparing a difference between first sampling data corresponding to first target sampling points and second sampling data corresponding to second target sampling points in the random access memory; and determining, according to the difference, whether the transmission of first link data on the target loopback link between the target sampling points is normal.

11. A non-transitory computer readable storage medium, storing a computer program, wherein the computer program is configured to execute, when running, the method according to claim 8.

12. An electronic device, comprising a memory and a processor, wherein the memory stores a computer program, and the processor is configured to run the computer program so as to execute the method according to claim 8.

13. The method according to claim 8, further comprising:

storing, by a first register, a configured pulse interval of the first loopback pulse signal, wherein the pulse interval is used for indicating a time interval that is from the end of a current pulse to the arrival of a next pulse and that is determined according to a clock domain of a sampling frequency, when the sampling frequency to be executed for the first link data has been determined, the pulse interval being a clock period of N clock domains, and N being a positive integer.

14. The method according to claim 8, further comprising:

performing, by a filter, configurable multiple expansion processing on the loopback pulse signal, according to a sampling ratio relationship between an input data and an output data of the filter, wherein the sampling ratio relationship is used for indicating a data change ratio, when the first loopback pulse signal and the first link data are synchronously transmitted in the loopback link, of the first link data before and after being processed by the filter.

15. The method according to claim 8, before transmitting the first loopback pulse signal in the plurality of loopback links established on the basis of the pre-configured connection combination, the method further comprises:

selecting a clock of a high-speed digital-to-analog converter and a high-speed analog-to-digital converter corresponding to the plurality of loopback links by using a data selector in the loopback selection module, determining the first loopback pulse signal to be transmitted in the loopback links, the clock is a read/write clock of the FIFO memory, and the first loopback pulse signal being is data of the FIFO memory.

16. The method according to claim 8, before determining, from the plurality of loopback links, a target loopback link on which sampling is to be performed, and sampling first link data that is on the target loopback link and passes through a target sampling point, the method further comprises:

perform three-level selection on a plurality of first sampling points to obtain target sampling points, wherein the three-level selection comprises: determining a plurality of link types included in the target loopback links; determining, from the plurality of first sampling points, a sampling point corresponding to each link type among the plurality of link types; in the case where a plurality of links exist simultaneously under the link type, selecting a sampling link from the plurality of links; performing selection on the plurality of link types according to a preset selection rule, determining a target link type for sampling, determining a target loopback link corresponding to the target link type, and determining a target sampling point; and comparing an enabling signal corresponding to the target sampling point with the first loopback pulse signal for determination.

17. An electronic device, comprising a memory and a processor, wherein the memory stores a computer program, and the processor is configured to run the computer program so as to execute the method according to claim 9.

18. An electronic device, comprising a memory and a processor, wherein the memory stores a computer program, and the processor is configured to run the computer program so as to execute the method according to claim 10.

19. A non-transitory computer readable storage medium, storing a computer program, wherein the computer program is configured to execute, when running, the method according to claim 9.

20. A non-transitory computer readable storage medium, storing a computer program, wherein the computer program is configured to execute, when running, the method according to claim 10.

* * * * *